United States Patent [19]

Vanover

[11] 4,270,784
[45] Jun. 2, 1981

[54] PROP MEANS FOR FACILITATING THE FUELING OF VEHICLES

[76] Inventor: Everett R. Vanover, 6700 Peachtree Industrial Blvd., Apt. M-8, Atlanta, Ga. 30360

[21] Appl. No.: 898,551

[22] Filed: Apr. 21, 1978

[51] Int. Cl.³ .............................................. E05C 17/12
[52] U.S. Cl. .................................... 292/338; 296/1 C; 292/DIG. 15
[58] Field of Search .......................... 217/60 B, 60 R; 296/1 C; 292/338, 339, DIG. 15

[56] References Cited

U.S. PATENT DOCUMENTS

| | | | |
|---|---|---|---|
| 1,602,044 | 10/1926 | Pye | 292/338 |
| 3,499,433 | 3/1970 | Payne | 217/60 X |
| 3,905,637 | 9/1975 | Smith | 217/60 B X |

Primary Examiner—Richard E. Moore
Attorney, Agent, or Firm—Beveridge, DeGrandi, Kline & Lunsford

[57] ABSTRACT

A prop means for use in association with a vehicle of the type having a cover-like member formed of the vehicle license plate and a license plate carrying bracket and which is normally closed and conceals the intake end of the filler conduit for fueling the vehicle, and which is operable to hold open such cover-like member to provide ready access to the intake end of the filler conduit when fueling the vehicle.

2 Claims, 2 Drawing Figures

PROP MEANS FOR FACILITATING THE FUELING OF VEHICLES

BRIEF BACKGROUND, FIELD AND OBJECTIVES OF THE INVENTION

This invention relates to improvements in devices for facilitating the fueling of vehicles.

Many of the present day automotive vehicles have the intake end of the filler conduit for the fuel tank thereof located on the rear end of the vehicle, usually in a centrally disposed position, which permits the vehicle to be more readily fueled regardless of to which side of the vehicle the fuel dispensing pump may be located. In concealment of the intake end of the fuel tank filler conduit, for cosmetic purposes, the cavity providing access to the intake end of the fuel tank filler conduit is frequently concealed behind the rear license plate, as mounted on a hinged license plate carrying bracket, which comprises a cover-like member that is normally in a closed position and conceals the intake end of the filler conduit, and is operable to be opened to provide access to the intake end of the fuel tank filler conduit. The hinged mount for the license plate carrying bracket is usually spring loaded, in a manner to normally maintain the license plate and license plate carrying bracket in a closed position as a cover-like member concealing the intake end of the fuel tank filler conduit. Thus, fueling of the vehicle sometimes becomes somewhat complicated in juggling the fuel pump nozzle, while holding open the license plate carrying bracket and also removing the cap from the intake end of the fuel tank filler conduit. During the course of these operations, it is not at all unusual for the license plate carrying bracket to snap shut on the fingers of the person attempting to fuel the vehicle.

Although the regular attendants of a vehicle fueling station may become quite adept at negotiating the filling of the vehicle with fuel without having the license plate carrying bracket slam shut on their fingers, or otherwise interfere with the fueling operation, such as might cause spillage of the fuel from the fuel pump nozzle, as might occur by dislodgment of the nozzle from the intake end of the fuel tank filler conduit on slamming shut of the license plate carrying bracket, the vehicle operator who may wish to self-service his vehicle at a self-service station, is usually not quite so adept and will thus frequently encounter difficulties in fueling his vehicle.

It is accordingly a primary object of the present invention to provide prop means for holding open the cover-like member formed by a license plate and license plate carrying bracket of a vehicle and which normally conceals the intake end of the filler conduit for fueling the vehicle, providing ready access to the intake end of the filler conduit in fueling the vehicle.

A further object of the invention is the provision of prop means as described and which is movable to an operable position to hold open the cover-like member formed by a license plate and license plate carrying bracket in a manner to provide ready access to the intake end of the fuel tank filler conduit for fueling of the vehicle and is movable to an inoperable position of non-interference with closure of such cover-like member to conceal the intake end of the fuel tank filler conduit.

A further object is the provision of prop means as described which may be readily mounted on existing vehicles by the vehicle owner and does not require any change, modification, or even any permanently attached structure to the vehicle.

Other objects and advantages of the invention will be apparent from the following detailed description, taken in connection with the accompanying drawing, and in which drawing:

DETAILED DESCRIPTION

Figure 1:
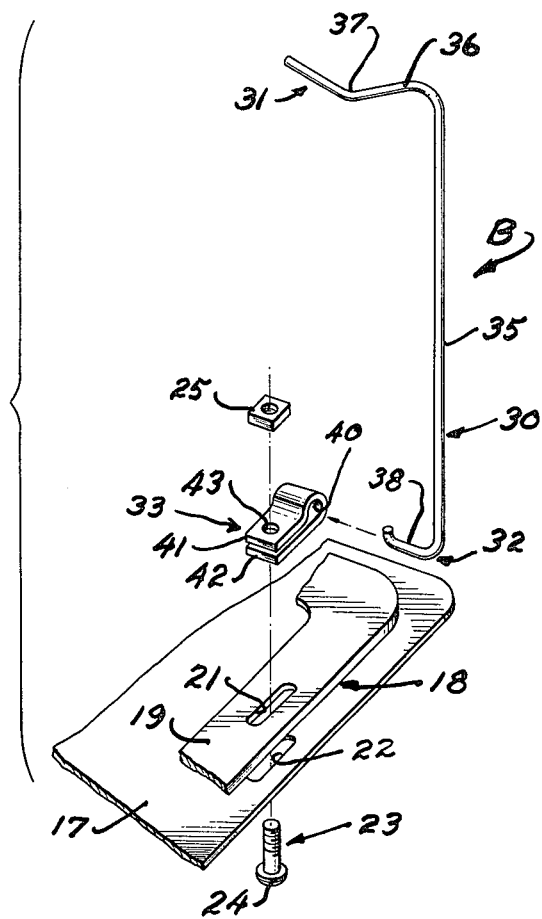
FIG. 1 is an exploded perspective of my improved prop means for facilitating the fueling of vehicles.

In the drawing, wherein similar reference characters are used to designate corresponding parts throughout the several views, the letter A may generally designate a vehicle in association with which my improved prop means B is designed to be used.

Vehicle A may comprise an automotive vehicle having a fuel tank (not shown) which is provided with a fuel tank filler conduit 10 having an intake end 11 into which may be received the nozzle of a fuel pump for fueling the vehicle. The usual cap (not shown) may be provided as a closure for the intake end 11 of fuel tank filler conduit 10.

Body portion 12 of vehicle A may be provided with a cavity 13 into which intake end 11 of filler conduit 10 opens in a manner to provide access thereto for fueling the vehicle. Cavity 13 is conventionally of a substantially rectangular peripheral configuration and may have an aperture 14 through which filler tank conduit 10 projects into cavity 13.

Vehicle A may be provided with a cover-like member 16 for concealing cavity 13 and filler tank conduit 10 which opens thereinto. As shown, cover-like member 16 may comprise a license plate 17 as attached to a license plate carrying bracket 18.

License plate carrying bracket 18 preferably includes a body portion 19 which is of the same general configuration of, but slightly smaller than, the license plate 17 to be carried thereby, and is provided with suitably positioned slotted apertures 21 to mate with slotted apertures 22 of license plate 17 to receive fastener means 23 for attachment of license plate 17 to license plate carrying bracket 18 and in a centered position with respect thereto.

Fastener means 23 may comprise a bolt 24 having a nut 25 attachable thereto.

Figure 2:
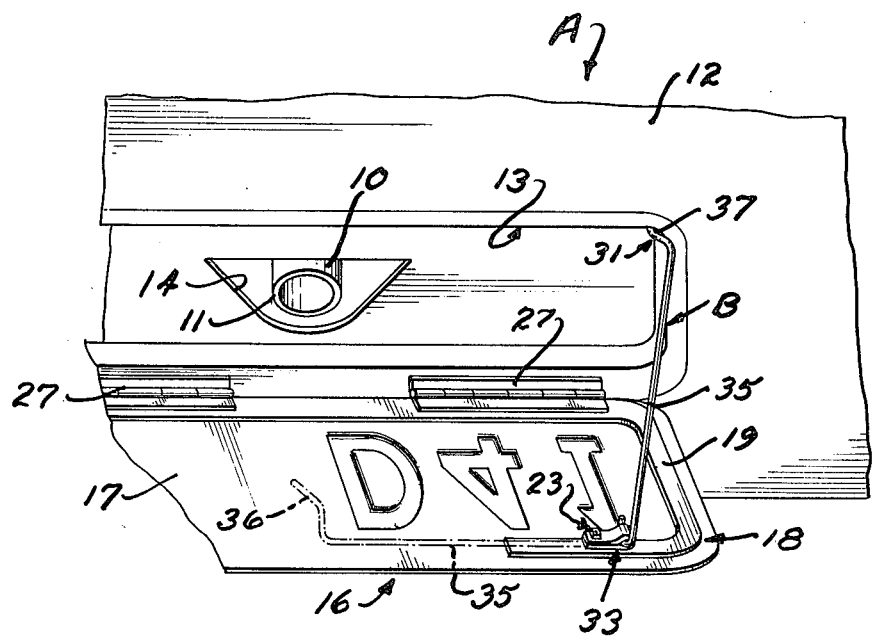
FIG. 2 is a perspective view showing operable attachment of my improved prop means to a vehicle in a manner to facilitate the fueling of the vehicle, the prop means being shown in full lines in an operable position for holding open the cover-like member formed by the license plate and license plate carrying bracket of the vehicle and in dot and dash lines in an inoperative position thereof whereby not to interfere with closure of such cover-like member to a position concealing the fuel tank filler conduit.

License plate carrying bracket 18 is usually pivotally supported on vehicle body portion 12 by hinges 27 provided along one side of cavity 13. Hinges 27 are usually spring loaded, or a spring type member otherwise provided so as to normally maintain said cover-like member 16 in a closed position with respect to cavity 13 to conceal cavity 13 and fuel tank filler conduit 10 opening thereinto, cover-like member 16 being pivotally movable on hinges 27 against the spring loading thereof to an open position, as shown in FIG. 2, to provide ready access to fuel tank filler conduit 10 for fueling of the vehicle.

Prop means B preferably includes a substantially elongated body portion 30 having a butt end 31 and a mounting end 32, and mounting means 33 for operable attachment thereof to vehicle A.

Body portion 30 of prop means B preferably comprises an elongated rod 35; butt end 31 thereof comprising a sinuous leg 36 of rod 35 and extending in a direction substantially normal to the axis of rod 35, and being preferably provided with a concavity 37 conformed to abut against the periphery of cavity 13, as will be subsequently described; and mounting end 32 thereof comprising a bight portion of rod 35 having a leg 38 thereof extending outwardly from and in a direction substantially normal to the axis of rod 35. Legs 36 and 38 are preferably disposed in the same plane of extension from rod 35 for a purpose as will be subsequently described.

Mounting means 33 preferably comprises a pillow block for pivotally supporting rod 35 and includes an eye 40 within which leg 38 of rod 35 may be journalled, having flanges 41 and 42 extending from opposite ends of eye 40 in a manner so that leg 38 of rod 35 may be readily inserted therewithin. Flanges 41 and 42 are each provided with an aperture 43 for receiving a fastener means for attachment of mounting means 33 to vehicle A.

Prop means B is shown in FIG. 2 in full lines as operably positioned to hold open cover-like member 16 of vehicle A, with mounting means 33 attached to license plate carrying bracket 18. As so attached, and since the relationship and attachment of cover-like member 16 to vehicle body portion 12 is somewhat the same even among different makes of automotive vehicles, prop means B of a given length can be used in association with different makes of automotive vehicles. As so disposed and attached, rod 35 is of a length to be operably positioned to hold open cover-like member 16, for ready access to fuel tank filler conduit 10, as shown in full lines in FIG. 2, with concavity 37 of butt end 31 thereof in abutment with and at a corner of the periphery of cavity 13 that is remote from the side thereof along which cover-like member 16 is mounted.

Since legs 37 and 38 of prop means B are in the same plane of extension from rod 35, prop means B can be pivoted to lie fairly flat against cover-like member 16, substantially parallel to license plate 17 thereof, in an inoperative position, as shown in FIG. 2, and, when so disposed, does not interfere with normal closure of cover-like member 16.

It is, of course, within the scope of this invention to attach prop means B to cover-like member 16 other than by a fastener means 23 as used in attachment of license plate 17 to license plate carrying bracket 18 and to otherwise conform the length of rod 30 to abut against a part of vehicle body portion 12 in holding open cover-like member 16 for ready access to fuel tank filler conduit 10.

It is likewise within the scope of this invention to mount prop means B on vehicle body portion 12 so that, in the operative positioning thereof, butt end 31 thereof abuts against cover-like member 16 to hold the same open for ready access to fuel tank filler conduit 10.

Various changes may be made to the form of invention herein shown and described without departing from the spirit of the invention and the scope of the following claims.

I claim:

1. Prop means for use in association with a vehicle having a body portion, a fuel tank provided with a conduit having an intake end for fueling said fuel tank, said vehicle body portion having a cavity providing access to said intake end of said fuel tank conduit, a cover-like member for concealing said cavity and said intake end of said conduit which opens thereinto, said cover-like member comprising a license plate carrying bracket having a license plate attached thereto, hinge means for attachment of said license plate carrying bracket to said vehicle body portion in a normally closed position with said cover-like member concealing said intake end of said fuel tank conduit and for movement thereof to an open position exposing said intake end of said fuel tank conduit for access thereto, and spring means urging said license plate carrying bracket to a normally closed position, said prop means comprising a substantially rigid elongated body portion having a butt end and a mounting end, said butt end being conformed for abutment with one said vehicle body portion and said cover-like member in positioning of said prop means in a juxtaposed relation thereto, and mounting means for attachment of said mounting end of said prop means to one said vehicle body portion and said cover-like member for pivotal movement of said prop means to an operative position of abutment of said butt end of said prop means to the other of said one said vehicle body portion and said cover-like member from the one having said mounting end of said prop means attached thereto and with said prop means extending between said vehicle body portion and said cover-like member in juxtaposed relation for maintaining said cover-like member in an open position to expose said intake end of said fuel tank conduit for facile access thereto and for pivotal movement of said prop means to an inoperative position to enable said cover-like member to move in a closed position concealing said intake end of said fuel tank conduit, said body portion of said prop means comprising an elongated rod, said mounting end thereof comprising a bight portion of said rod having a leg extending outwardly from and in a direction substantially normal to said body portion thereof, said leg being journalled for pivotal movement within said mounting means with the axis of said leg comprising the pivot axis of said prop means for pivotal movement thereof, and said butt end thereof comprising a sinuous leg of said rod extending in a direction substantially normal to said body portion thereof and in the same plane as said leg of said bight portion of said rod, said mounting means including fastener means for attachment thereof to said license plate carrying bracket and which also comprises a fastener means for attachment of said license plate to said license plate carrying bracket, said cavity of said vehicle body portion has a substantially rectangular peripheral configuration and along one side of which is attached said license plate carrying bracket, said rod being of a length for abutment of a concavity of said sinuous leg of said butt end of said rod at a corner of said substantially rectangular periphery of said cavity remote from the side thereof along which said license plate carrying bracket is mounted in said operative position of pivotal movement of said prop means.

2. Prop means as specified in claim 1 wherein in said inoperative position of pivotal movement of said prop means said common plane of said leg of said bight portion and said leg comprising said butt end is substantially parallel to said license plate carried by said license plate carrying bracket and in juxtaposed relation with respect to said license plate carrying bracket for non-interference with movement of said license plate carrying bracket from an open position to a closed position.

* * * * *